United States Patent
Wilder

[15] 3,666,304
[45] May 30, 1972

[54] SPLINE SYSTEM
[72] Inventor: Lawrence B. Wilder, Tulsa, Okla.
[73] Assignee: Amoco Production Company, Tulsa, Okla.
[22] Filed: July 21, 1971
[21] Appl. No.: 164,723

[52] U.S. Cl..........................................287/52.05, 287/52.08
[51] Int. Cl..................................................F16d 1/06
[58] Field of Search..............287/52.05, 52.08, 53 SS, 53 LK; 64/23

[56] References Cited

UNITED STATES PATENTS 1,886,128  11/1932  Small..................................287/53 LK
2,905,490  9/1959  Trandel..........................287/52.05 X Primary Examiner—Andrew V. Kundrat
Attorney—Paul F. Hawley, et al.

[57] ABSTRACT

This invention relates to a spline arrangement for connecting a housing to an internal cylindrical member. A key member having a rectangular base is provided with anti-shear rings made integral with the base. Pockets are cut in the outer wall of the inner cylindrical member to receive the key member. Bolts extending through the housing wall pull the key member outwardly until the anti-shear rings enter mating circular grooves on the inside of the housing. Rotary torque can then be transmitted between the housing and the interior cylindrical member.

6 Claims, 4 Drawing Figures

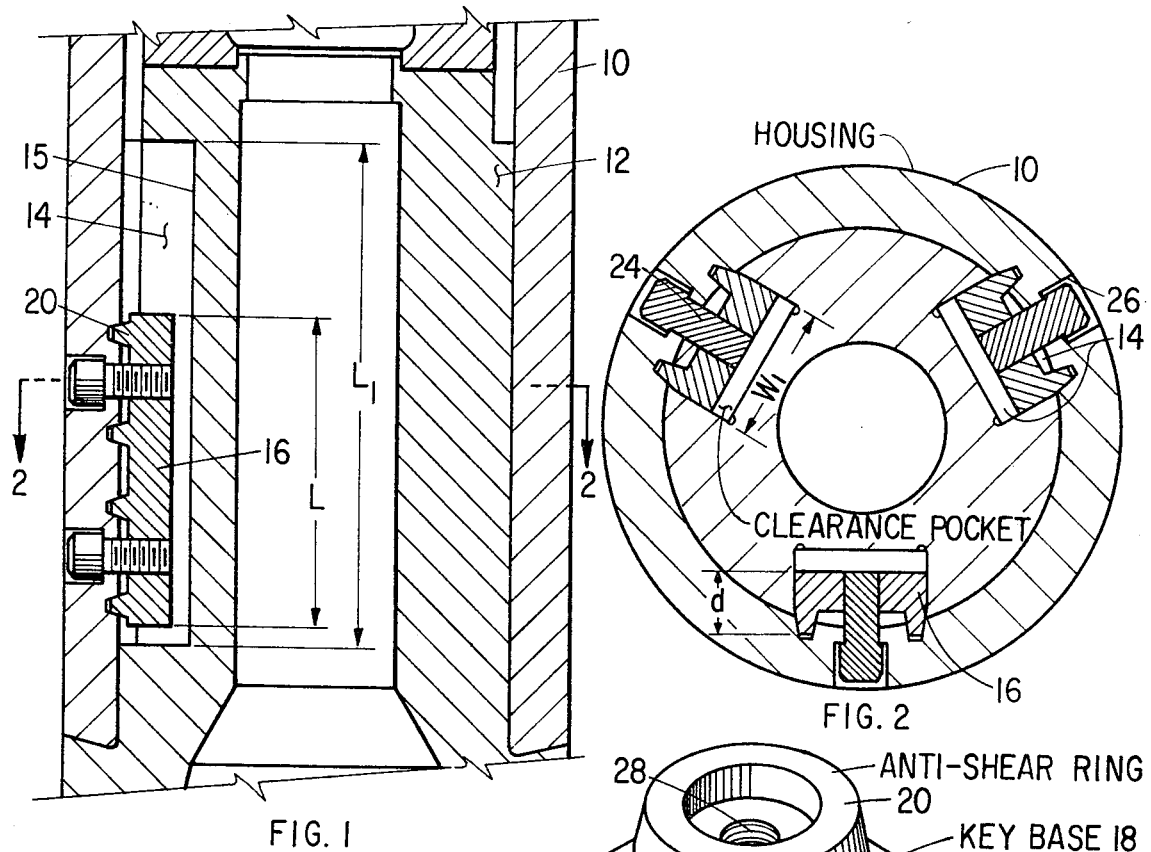
FIG. 1
FIG. 2
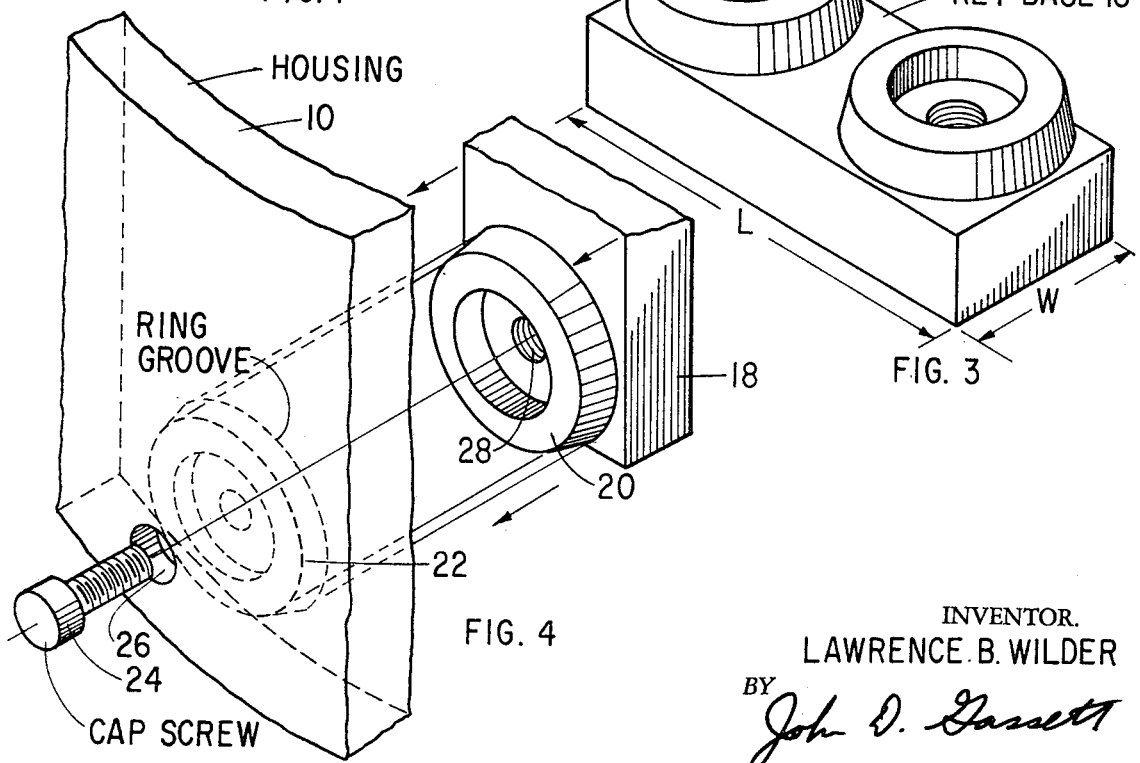
FIG. 3
FIG. 4
INVENTOR.
LAWRENCE B. WILDER
BY
John D. Gassett
ATTORNEY

SPLINE SYSTEM

BACKGROUND OF THE INVENTION

1. Field of the Invention

This invention relates to a system for making a spline connection between an inner cylindrical member and a surrounding housing. The spline system transmits rotary torque between the inner member and the housing and permits limited longitudinal movement between the two.

2. Setting of the Invention

There are many mechanical arrangements whereby it is desired to have a spline connection between two members. The spline member must transmit rotary torque between the two and permit only limited longitudinal motion therebetween. One such mechanical arrangement is shown in U.S. Pat. No. 3,464,505 issued Sept. 2, 1969. That patent relates to a percussion drill tool for use in drilling boreholes in the earth. That particular percussion drill tool has an anvil connected to a bit. Surrounding the cylindrical anvil is a cylindrical housing which is connected to a drill string which extends to the surface. The anvil must be connected to the housing by some spline arrangement. The present invention discloses a novel spline arrangement useful in this context.

BRIEF SUMMARY OF THE INVENTION

This invention relates to a spline arrangement for connecting a housing to an internal cylindrical member. A key member having a rectangular base is provided with anti-shear rings made integral with the base. Pockets are cut in the outer wall of the inner cylindrical member to receive the key member. Grooves, matching the anti-shear rings, are cut in the interior side of the housing. Bolts extending through the housing wall pull the key member outwardly until the anti-shear rings enter the mating grooves on the inside of the housing. Rotary torque can then be transmitted between the housing and the interior cylindrical member.

BRIEF DESCRIPTION OF THE DRAWINGS

A better understanding of the invention and various modifications and objectives thereof can be made with the following description taken in conjunction with the drawings.

FIG. 1 is a cross section of a cylindrical hollow anvil and surrounding housing utilizing the spline system of this invention.

FIG. 2 is a cross sectional view taken along the line 2—2 of FIG. 1.

FIG. 3 shows the novel key member of FIG. 1.

FIG. 4 is an isometric exploded illustration of a key member and mating ring groove.

Attention is first directed to FIG. 1. Shown therein is a cylindrical housing 10. Mounted inside housing 10 is a hollow anvil 12. The upper end of housing 10 can be connected by means not shown to a drill string ordinarily used in the drilling of boreholes. Anvil 12 is connected by means not shown to a drill bit. As the drill string and the drill bit form no part of this invention, it is not believed that any further comment thereon need be made.

A plurality of pockets 14 are formed in the outer wall of anvil 12. Mounted in these pockets are key members 16. FIG. 2 illustrates three such pockets and key members. As can be seen clearly in FIG. 3 each key member includes a key base 18 and a pair of anti-shear rings 20. It is to be noted that one or more shear rings can be utilized. As shown in FIG. 4 the housing 10 has a ring groove 22 for each anti-shear ring 20 of each member. Pocket 14 is made as deep as the distance or thickness d shown in FIG. 2 of the key member.

Means will now be discussed for pulling the key member 16 so that the anti-shear rings 20 are pulled snugly into ring groove 22. This preferably includes cap screws 24 which extends through the stepped bore 26 of the housing. These cap screws mate with internal threads 28 on key base 18 and pulls the key member 16 outwardly until the shear rings enter the ring grooves of the housing. At this point key member 16 is fixed with respect to the housing 10. Any shear torque between the key member 16 and the housing 10 is transmitted through the anti-shear rings 20. All the cap screw is required to do is to hold the key member in the position shown in FIG. 1; the bulk of the torque is transmitted through the anti-shear rings 20.

A few comments will be made now on the relative dimensions of the key member 16 to pocket 14. The key member 16 has a longitudinal distance L which is relatively short in comparison to the distance $L_1$ which is the longitudinal distance of the pocket 14. These distances L and $L_1$ are shown in FIG. 1. This permits longitudinal movement of housing 10 with respect to anvil 12. The other distance W of key base 18 as shown in FIG. 3 is approximately the same as, but slightly less, than the distance of $W_1$ of the pocket 14 shown in FIG. 2. Thus key base 18 slidably fits into pocket 14 so that it can be moved readily outwardly by screw 24.

The spline or key member 16 is easily installed. Spline 16 is placed in pocket 14 of the anvil. Key member 16 is shoved against wall 15 of the pocket and then the housing 10 is dropped over the anvil and key members 16. The bolt holes 26 of housing 10 are then aligned with the threads 28 of key member 16. Next, bolts 24 are screwed into threads 28 pulling the key member 16 into housing 10 into the position shown in FIGS. 1 and 2.

The type metal used in this assembly depends upon the particular type of service to which it is to be subjected. Ordinarily the elements would be made of some high grade steel.

While the above invention has been described with a certain amount of detail, various type modifications can be made without departing from the spirit or the scope of the invention. For example, shear ring 20 can be a separate part from key base 18. Grooves would then be cut in key member 16 as well as housing 10 to match ring 20.

I claim:

1. A spline system for connecting an outer housing to an inner elongated member closely fitting the interior of said housing which comprises:
    a key member having a base and an anti-shear ring fixed to the base,
    a pocket in the outer wall of said inner elongated member for receiving the key member,
    an annular ring groove in the inner wall of said housing, said ring groove being sized to receive the anti-shear ring of said key member,
    means to force said key member radially outwardly into said ring groove so that when said ring groove is properly aligned with said anti-shear ring, said anti-shear ring is forced into said ring groove.

2. A spline system as defined in claim 1 in which said base of said key member has two anti-shear rings thereon and said outer housing has two ring grooves for receiving the two anti-shear rings.

3. A spline system as defined in claim 1 in which the longitudinal distance $L_1$ of said pocket of said inner elongated member is much larger than the longitudinal distance L of the said key member.

4. A spline system as defined in claim 1 in which the means to move said key member radially outward includes a hole in said housing at the center of said ring groove, a threaded screw extending through said hole and a threaded hole in the base of said key member aligned with the center of said anti-shear ring.

5. A spline system as defined in claim 1 in which the distance W of said key base is about the same as the distance $W_1$ of the grooved pocket of the elongated member.

6. A spline system for connecting an outer housing to an inner elongated member closely fitting the interior of said housing which comprises:
    a key base;
    a pocket in the outer part of the wall of said inner elongated member for receiving the key base;
    an anti-shear ring;

a first annular ring groove formed in the inner wall of said housing, said ring groove being seized to receive said anti-shear ring;

a second annular ring groove and formed in said key base and seized to receive said anti-shear ring;

means to force said key base radially outwardly so that when properly aligned said anti-shear ring is partly in said first ring groove and partly in said second ring groove.

* * * * *